3,291,690
25-AZA-CHOLESTATRIENES, PROCESS FOR PRO-
DUCTION AND METHOD OF TREATMENT
Daniel Bertin, Montrouge, and Jacques Perronnet, Paris,
France, assignors to Roussel-UCLAF, Paris, France, a
corporation of France
No Drawing. Filed Mar. 18, 1965, Ser. No. 440,945
Claims priority, application France, Mar. 27, 1964,
968,943; June 17, 1964, 978,629, Patent 3,851 M
23 Claims. (Cl. 167—65)

The invention relates to novel steroids selected from the group consisting of 25-aza-cholestatrienes of the formula

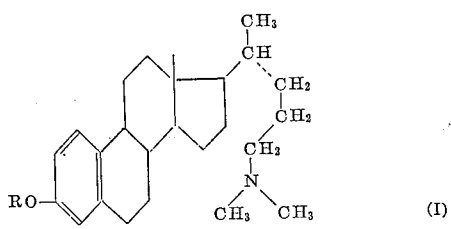

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts and to a novel process for their preparation as well as novel intermediates thereof. The invention also relates to novel hypocholesterolemiant compositions and to a novel method of reducing cholesterol in warm-blooded animals. The compounds of Formula I can be named as 3-OR-25-aza-19-nor-$\Delta^{1,3,5(10)}$-cholestatrienes or 3 - OR - 20α-(dimethylaminopropyl)-19-nor-$\Delta^{1,3,5(10)}$-pregnatrienes and the former terminology will be used hereafter.

The novel 25-aza-cholestatrienes of the invention possess interesting pharmacological properties, namely an intense hypocholesterolemiant activity. Contrary to known anticholesterolemiants which inhibit the synthesis of cholesterol such as 1-[p-(2-dimethylaminoethoxy)phenyl]-1-(p-tolyl)-2-(p-chlorophenyl)-ethanol or 22,25-diaza-cholestanol, the compounds of the invention do not cause even at increased dosages aplasia nor suprarenal hypertrophy which shows a deterioration of the cortical parenchyma.

It is an object of the invention to provide novel 25-aza-cholestatrienes of Formula I and their acid addition salts.

It is another object of the invention to provide a novel process for the preparation of 25-aza-cholestatrienes of Formula I.

It is a further object of the invention to provide novel intermediates for the 25-aza-cholestatrienes of Formula I.

It is an additional object of the invention to provide novel hypocholesterolemiant compositions.

It is another object of the invention to provide a novel method of reducing cholesterol in warm-blooded animals.

These and other objects and advantages of the invention will become obvious from the following detailed description.

The novel compounds of the invention are selected from the group consisting of 25-aza-cholestatrienes of the formula

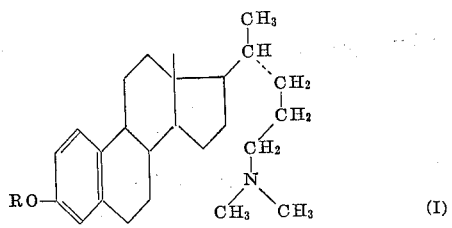

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts. If R is lower alkyl, methyl and ethyl are preferred embodiments.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid, cycloalkyl alkanoic acids such as cyclopentyl acetic acid, cyclohexyl acetic acid, cyclopentyl propionic acid and cyclohexyl propionic acid; arylalkanoic acids such as phenyl acetic acids and phenyl propionic acid; aryl carboxylic acids such as benzoic acid and 2,4-dinitrobenzoic acid; phenoxy alkanoic acids such as phenoxy acetic acid, p-chloroacetic acid, 2,4-dichlorophenoxy acetic acid, 4-tert.-butylphenoxy acetic acid, 3-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

Examples of suitable acids for the formation of the non-toxic, pharmaceutically acceptable acid addition salts of the compounds of Formula I are inorganic acids such as hydrochloric acid, hydrobromic acid, sulfuric acid, etc. and organic acids such as citric acid, tartaric acid, etc.

The novel process of the invention for the preparation of the 25-aza-cholestatrienes of Formula I is comprised of condensing dimethylamine with 3-acyloxy 5β-cholanic acid chloride wherein the acyl radical is derived from an organic carboxylic acid having 1 to 18 carbon atoms with simultaneous saponification of the 3α-acyloxy group to form 25-aza-5β-cholestane-3α-ol-24-one, oxidizing the latter with chromic acid anhydride to form 25-aza-5β-cholestane-3,24-dione, brominating and dehydrobrominating the latter to form 25-aza-$\Delta^{1,4}$-cholestadiene-3,24-dione, subjecting the latter to pyrolysis to form 25-aza-19-nor-$\Delta^{1,3,5(10)}$-cholestatriene-3-ol-24-one and reducing the latter with an aluminum hydride to form 25-aza-19-nor-$\Delta^{1,3,5(10)}$-cholestatriene-3-ol which can be reacted with an acid to form the corresponding acid addition salt, or which can be reacted with an acylating agent such as an acid anhydride or acid halide to form the corresponding 3-acyloxy-25-aza-19-nor-$\Delta^{1,3,5(10)}$-cholestatriene or which can be reacted with a lower alkyl alkylating agent to form the corresponding 3-lower alkoxy-25-aza-19-nor-$\Delta^{1,3,5(10)}$-cholestatriene. The reaction scheme is illustrated in Table I.

TABLE I

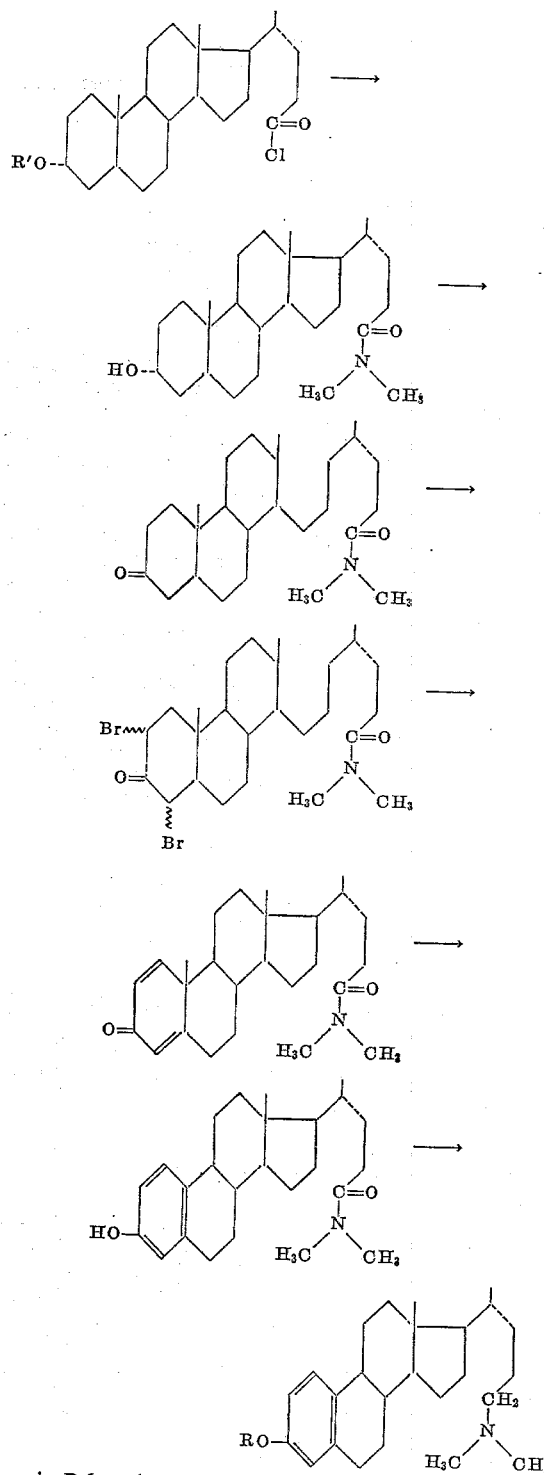

wherein R has the above definition and R' is an acyl radical of an organic carboxylic acid having 1 to 18 carbon atoms.

A preferred mode of the process of the invention for the preparation of 25-aza-19-nor-$\Delta^{1,3,5(10)}$-cholestatriene-3-ol- is comprised of condensing dimethylamine with 3α-formyloxy-5β-cholanic acid chloride is an organic solvent such as benzene, preferably at temperatures below room temperature to form 25-aza-5β-cholestane 3α-ol-24-one, oxidizing the latter with chromic acid anhydride in the presence of an acid such as sulfuric acid, phosphorus acid or acetic acid or in the presence of pyridine to form 25-aza-5β-cholestane-3,24-dione, brominating the latter with bromine in an organic solvent such as dioxane in the presence of a catalyst such as hydrobromic acid with moderate heat to form 2,4-dibromo-25-aza-5β-cholestane-3,24-dione, dehydrobrominating the latter with a mixture of lithium carbonate and lithium bromide in dimethylformamide at reflux to form 25-aza-$\Delta^{1,4}$-cholestadiene-3,24-dione, subjecting the latter in tetralin to pyrolysis at temperatures of the order of 550° C. to form 25-aza-19-nor-$\Delta^{1,3,5(10)}$-cholestatriene-3-ol-24-one and reducing the latter with lithium aluminum hydride or aluminum hydride to form 25-aza-19-nor-$\Delta^{1,3,5(10)}$-cholestatriene-3-ol.

The hypocholesterolemiant compositions of the invention are comprised of a compound selected from the group consisting of 25-aza-cholestatrienes of the formula

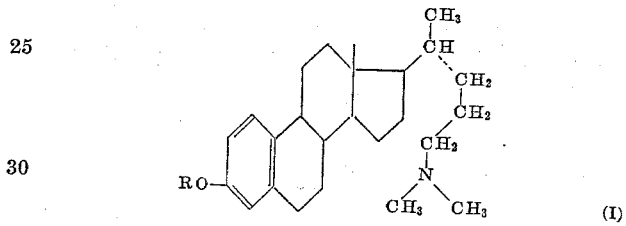

(I)

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts and a major amount of a pharmaceutical carrier. The compositions may be prepared in the form of injectable solutions and suspensions, in ampules or in multiple dose flacons, in the form of tablets, coated tablets and tablets to be placed under the tongue, as capsules and as suppositories prepared in known ways.

The compositions may be used for the treatment of hypercholesterolemia as preventive or curative agents and for the treatment of arterial disorders, cerebral arteritis, aortitis, coronary inflammation, angina pectoris and atheromatosis.

The novel method of the invention of reducing cholesterol in warm-blooded animals comprises administering an effective amount of a compound selected from the group consisting of 25-aza-cholestatrienes of the formula

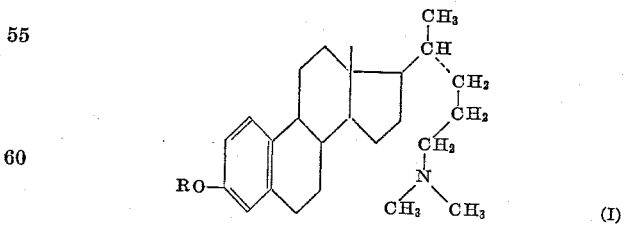

(I)

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts. The compounds may be administered orally, perlingually, transcutaneously or rectally. The usual useful does is 2 to 10 mg. per dose and 10 to 50 mg. per day depending upon the method of administration.

In the following examples there are described several preferred embodiments to illustrate the invention. However, it should be understood that the invention is not intended to be limited to the specific embodiments.

EXAMPLE I.—PREPARATION OF 3α-FORMYLOXY-5β-CHOLANIC ACID CHLORIDE

Step A.—Preparation of 3α-formyloxy-5β-cholanic acid 100 gm. of 3α-hydroxy-5β-cholanic acid were introduced into 700 cc. of 98% formic acid and the reaction mixture was heated to 45° C. Then the heating was stopped and the mixture was agitated for 2 hours. The mixture was cooled and vacuum filtered and the precipitate was washed with water and dried to obtain 105 gm. of 3α-formyloxy-5β-cholanic acid having a melting point of 142° C.

The colorless compound was slightly soluble in ethanol, isopropylic ether and ethyl acetate and soluble in benzene and chloroform.

Analysis ($C_{25}H_{40}O_4$): Molecular weight=404.57. Calculated: C, 74.21%; H, 9.97%. Found: C, 74.2%; H, 9.7%.

Step B.—Preparation of 3α-formyloxy-5β-cholanic acid chloride 20 gm. of 3α-formyloxy-5β-cholanic acid were introduced into 80 cc. of thionyl chloride and the mixture was agitated for 2 hours at room temperature. Then the reaction mixture was allowed to stand for a period of 15 hours after which it was distilled under vacuum and the traces of residual thionyl chloride were removed by entrainment with benzene to obtain 3α-formyloxy-5β-cholanic acid chloride having a melting point of about 135° C. The product was utilized as such in the next step of the synthesis.

EXAMPLE II.—PREPARATION OF 25-AZA-19-NOR-$\Delta^{1,3,5(10)}$-CHOLESTATRIENE-3-OL

Step A.—Preparation of 25-aza-cholestane-3α-ol-24-one 21 gm. of 3α-formyloxy-5β-cholanic acid chloride were introduced into a solution of 50 gm. of dimethylamine in 200 cc. of anhydrous benzene and the resulting suspension was allowed to stand for 64 hours at a temperature of 0° C. Then ice water was added to the suspension which was vacuum filtered and the precipitate was washed first with sodium bicarbonate and then with water until the wash waters were neutral and finally recrystallized from benzene to obtain 16.8 gm. of 25-aza-5β-cholestane-3α-ol-24-one having a melting point of 166° C. and a specific rotation $[\alpha]_D^{20}=+35.5°\pm2°$ (c.=0.8% in ethanol).

The product was colorless, insoluble in water slightly soluble in benzene and soluble in chloroform.

Analysis ($C_{26}H_{45}O_2N$): Molecular weight=403.63. Calculated: C, 77.36%; H, 11.24%; N, 3.47%. Found: C, 77.6%; H, 11.2%; N, 3.5%.

This compound is not described in the literature.

Step B.—Preparation of 25-aza-5β-cholestane-3,24-dione 1 gm. of 25-aza-5β-cholestane-3α-ol-24-one was dissolved in 6 cc. of acetic acid and then drop by drop 0.7 cc. of a solution of 2.70 gm. of chromic anhydride in 2.30 cc. of sulfuric acid was added after which water in sufficient quantities was added to obtain 10 cc. of a solution which was agitated for 20 minutes. The solution was diluted with water and extracted with methylene chloride. The extract was washed with salt water, dried and evaporated to dryness. The residue was crystallized from isopropyl ether to obtain 0.436 gm. of 25-aza-5β-cholestane-3,24-dione with a melting point of 115° and a specific rotation $[\alpha]_D^{20}=+37°\pm2°$ (c.=0.8% in ethanol).

The colorless compound was insoluble in water, slightly soluble in heptane, fairly soluble in cyclohexane and soluble in ethanol, ether, benzene and chloroform.

Analysis ($C_{23}H_{43}O_2N$): Molecular weight=401.61. Calculated: C, 77.76%; H, 10.79%; N, 3.48%. Found: C, 77.6%; H, 10.6%; N, 3.5%.

This compound is not described in the literature.

Step C.—Preparation of 2,4-dibromo-25-aza-5β-cholestane-3,24-dione 0.5 gm. of 25-aza-5β-cholestane-3,24-done was dissolved in 15 cc. of anhydrous dioxane and heated to 58° C. after which a very small quantity of hydrobromic acid was added thereto. Then, over a period of 6 minutes 4.4 cc. of ethyl acetate contaniing 0.44 gm. of bromine were introduced and water was added at the end of the reaction. The mixture was vacuum filtered and the precipitate was washed with water until the wash waters were neutral, then triturated with ethyl acetate and dried to obtain 0.527 gm. of 2,4-dibromo-25-aza-5β-cholestane-3,24-dione having a melting point of 283° C.

The colorless compound was insoluble in water, slightly soluble in ethanol, acetone and ethyl acetate and soluble in chloroform.

Analysis ($C_{26}H_{41}Br_2NO_2$): Molecular weight=559.44. Calculated: C, 55.82%; H, 7.38%; N, 2.50%; Br, 28.59%. Found: C, 55.7%; H, 7.4%; N, 2.4%; Br, 28.4%.

This product is not described in the literature.

Step D.—Preparation of 25-aza-$\Delta^{1,4}$-cholestadiene-3,24-dione 5.24 gm. of lithium carbonate and 2.62 gm. of lithium bromide were placed in suspension in 50 cc. of dimethylformamide. Under reflux, a suspension of 2.62 gm. of 2,4 - dibromo - 25 - aza - 5β - cholestane - 3,24 - dione in 50 cc. of dimethylformamide was added thereto and the suspension was maintained at reflux for one hour. Then water was poured into the suspension which was then neutralized with the addition of acetic acid. The product was vacuum filtered, washed with water until the wash waters were neutral, dried at 60° C. and recrystallized from ethyl acetate to obtain 1.5 gm. of 25-aza-$\Delta^{1,4}$-cholestadiene-3,24-dione having a melting point of 180° C. and a specific rotation $[\alpha]_D^{20}=+34°\pm2°$ (c.=0.5% in ethanol).

The colorless compound was insoluble in water and isopropyl ether, slightly soluble in ethyl acetate and soluble in ethanol, benzene and chloroform.

Analysis ($C_{26}H_{39}NO_2$): Molecular weight=397.58. Calculated: C, 78.54%; H, 9.89%; N, 3.52%. Found: C, 78.5%; H, 9.8%; N, 3.7%.

This product is not described in the literature.

Step E.—Preparation of 25-aza-19-nor-$\Delta^{1,3,5(10)}$-cholestatriene-3-ol-24-one 2.855 gm. of 25-aza-$\Delta^{1,4}$-cholestadiene-3,24-dione were dissolved in 290 cc. of tetralin and the solution was then slowly passed into a furnace for pyrolysis at 550° C. Thereafter, the solution was evaporated to dryness under vacuum and the residue was successively recrystallized from benzene and methanol to obtain 1.132 gm. of 25-aza - 19 - nor - $\Delta^{1,3,5(10)}$ - cholestatriene - 3 - ol - 24 - one having a melting point of 228° C. and a specific rotation $[\alpha]_D^{20}=+78°5\pm2°$ (c.=0.5% in ethanol).

This compound occurred in the form of colorless needles, very slightly soluble in ethyl acetate, slightly soluble in ethanol, benzene and methanol and soluble in choroform.

Analysis ($C_{25}H_{37}NO_2$): Molecular weight=383.56. Calculated: C, 78.28%; H, 9.72%; N, 3.65%. Found: C, 78.2%; H, 9.5%; N, 3.5%.

This product was not described in the literature.

Step F.—Preparation of 25-aza-19-nor-$\Delta^{1,3,5(10)}$-cholestatriene-3-ol 1.2 gm. of lithium aluminum hydride were introduced into 85 cc. of anhydrous dioxane and then a suspension of 2.30 gm. of 25-aza-19-nor-$\Delta^{1,3,5(10)}$-cholestatriene-3-ol-24-one in 50 cc. of anhydrous dioxane was added thereto and the reaction mixture was heated to reflux for 16 hours. Then, slowly and with cooling, 20 cc. of dioxane containing 10% water were added, followed by addition of 3.4 cc. of concentrated hydrochloric acid and finally 8 cc. of triethylamine. The mineral salts were vacuum filtered and washed with dioxane. The dioxane solutions were distilled to dryness and the residue was taken up with benzene, filtered, distilled until dry and crystallized from methanol to obtain 1.45 gm. of 25-aza-19-nor-$\Delta^{1,3,5(10)}$-cholestatriene-3-ol having a melting point of 192° C. and a specific rotation $[\alpha]_D^{20}=+82°\pm1.5°$ (c.=0.75% in ethanol).

The colorless compound was slightly soluble in ethanol, isopropyl ether and methanol, fairly soluble in benzene and soluble in chloroform.

Analysis ($C_{25}H_{39}NO$): Molecular weight=369.57. Calculated: C, 81.25%; H, 10.63%; N, 3.79%. Found: C, 81.3%; H, 10.6%; N, 3.9%.

This product is not described in the literature.

*Step G.—Preparation of 25-aza-19-nor-$\Delta^{1,3,5(10)}$-cholestatriene-3-ol-hydrochloride*

1.45 gm. of 25-aza-19-nor-$\Delta^{1,3,5(10)}$-cholestatriene-3-ol were dissolved in 30 cc. of benzene and 5 cc. of isopropanol and 0.5 cc. of hydrochloric acid was added thereto. The isopropanol and water were removed by distillation and the resulting suspension was cooled and vacuum filtered. The precipitate was washed first with benzene, then with ether, and dried to obtain 1.56 gm. of 25-aza-19-nor-$\Delta^{1,3,5(10)}$-cholestatriene-3-ol hydrochloride having a melting point of 260° C.

The colorless compound was insoluble in water and benzene and very slightly soluble in ethanol and isopropanol.

It is not described in the literature.

PHARMACOLOGICAL STUDY OF 25-AZA-19-NOR-$\Delta^{1,3,5(10)}$-19-NOR-$\Delta^{1,3,5(10)}$-CHOLESTATRIENE-3-OL

*Hypocholesterolemiant activity on the female rat*

25-aza-19-nor-$\Delta^{1,3,5(10)}$-cholestatriene-3-ol used as a suspension in an aqueous dispersive liquid was administered for 10 days orally to groups of female rats having an average weight of 200 gm. at a dose of 5 mg./kg. per day. On the 11th day, the animals were sacrificed and a blood sample was taken from each animal to determine the amount of serous sterols. The suprarenals, liver and kidneys were removed and weighed. Table II summarizes the results obtained.

TABLE II

| Groups | Dose, mg./kg. | Serous sterols, gm. ⁰/₀₀ | Suprarenals, mg. | Liver, gm. percent gm. | Kidneys, mg. percent gm. | Weight value, percent |
|---|---|---|---|---|---|---|
| Controls | 0 | 0.67 | 60.4 | 4.39 | 720 | +8 |
| Treated | 5 | 0.31 (−54%) | 59.9 | 4.65 | 734 | +2 |

A second test was conducted under the same experimental conditions with doses of 2 and 5 mg./kg. and the results of Table III were obtained.

TABLE III

| Groups | Dose, mg./kg. | Serous sterols, gm. ⁰/₀₀ | Suprarenals, mg. | Liver, gm. percent gm. | Kidneys, mg. percent gm. | Weight value, percent |
|---|---|---|---|---|---|---|
| Controls | 0 | 0.53 | 54.0 | 4.62 | 740 | +4.5 |
| Treated | 2 | 0.39 (−26%) | 50.8 (−6%) | 4.85 | 746 | 0 |
|  | 5 | 0.24 (−55%) | 67.2 (+20%) | 4.69 | 779 | −2 |

Tables II and III show that 25-aza-19-nor-$\Delta^{1,3,5(10)}$-cholestatriene-3-ol possesses important hypocholesterolemiant action at a dose of 5 mg./kg. administered daily by mouth for a period of 10 days and is also active at a dose of 2 mg./kg. On the other hand, the said product has no unfavorable influence on the growth of the animals nor on the weight of the suprarenals, the liver and the kidneys. Moreover, in the test by Allen and Doisy, 25-aza-19-nor-$\Delta^{1,3,5(10)}$-cholestatriene-3-ol is devoid of any estrogenic effect at the dose of 2 mg./rat administered orally in an aqueous suspension.

Various modifications of the compositions and method of the invention may be made without departing from the spirit or scope thereof and it is to be understood that the invention is to be limited only as defined in the appended claims.

We claim:

1. A compound selected from the group consisting of 25-aza-cholestatrienes of the formula

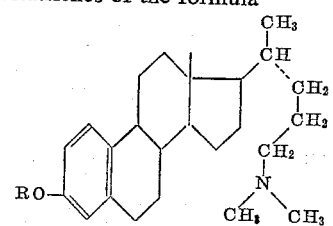

wherein R is selected from the group consisting of hydrogen, lower alkyl of 1 to 7 carbon atoms and an acyl radical of an organic carboxylic acid having 1 to 18 carbon atoms and their non toxic, pharmacologically acceptable acid addition salts.

2. 25-aza-19-nor-$\Delta^{1,3,5(10)}$-cholestatriene-3-ol.
3. 25-aza-19-nor-$\Delta^{1,3,5(10)}$-cholestatriene - 3 - ol hydrochloride.
4. 25-aza-5β-cholestane-3α-ol-24-one.
5. 25-aza-5β-cholestane-3,24-dione.
6. 2,4-dibromo-25-aza-5β-cholestane-3,24-dione.
7. 25-aza-$\Delta^{1,4}$-cholestadiene-3,24-dione.
8. 25-aza-19-nor-$\Delta^{1,3,5(10)}$-cholestatriene-3-ol-24-one.
9. A process for the preparation of 25-aza-19-nor-$\Delta^{1,3,5(10)}$-cholestatriene-3-ol which comprises condensing dimethylamine with 3-acyloxy-5β-cholanic acid chloride wherein the acyl radical is derived from an organic carboxylic acid having 1 to 18 carbon atoms with simultaneous saponification of the 3α-acyloxy group to form 25-aza-5β-cholestane-3α-ol-24-one, oxidizing the latter with chromic acid anhydride to form 25-aza-5β-cholestane-3,24-dione, brominating and dehydrobrominating the latter to form 25-aza-$\Delta^{1,4}$-cholestadiene-3,24-dione, subjecting the latter to pyrolysis to form 25-aza-19-nor-$\Delta^{1,3,5(10)}$-cholestatriene-3-ol-24-one and reducing the latter with an aluminum hydride to form 25-aza-19-nor-$\Delta^{1,3,5(10)}$-cholestatriene-3-ol.

10. The process of claim 9 wherein the starting material is 3α-formyloxy-5β-cholanic acid chloride.
11. The process of claim 9 wherein the chromic acid anhydride is employed in the presence of an acid.
12. The process of claim 9 wherein the bromination is effected with bromine in the presence of hydrobromic acid.

13. The process of claim 9 wherein the dehydrobromination is effected with a mixture of lithium carbonate and lithium bromide in dimethylformamide.

14. The process of claim 9 wherein the reduction is effected with a hydride selected from the group consisting of aluminum hydride and lithium aluminum hydride.

15. A process for the preparation of 25-aza-19-nor-$\Delta^{1,3,5(10)}$-cholestatriene-3-ol which comprises condensing dimethylamine with 3α-formyloxy-5β-cholanic acid chloride in benzene at temperatures of about 0° C. to form 25-aza-5β-cholestane-3α-ol-24-one, oxydizing the latter with chromic acid anhydride in the presence of sulfuric acid to form 25-aza-5β-cholestane-3,24-dione, brominating the latter with bromine in dioxane in the presence of hydrobromic acid to form 2,4-dibromo-25-aza-5β-cholestane-3,24-dione, dehydrobrominating the latter with a mixture of lithium carbonate and lithium bromide in dimethylformamide to form 25-aza-$\Delta^{1,4}$-cholestadiene-3,24-dione, subjecting the latter to pyrolysis at about 550° C. to form 25 - aza - 19 - nor - $\Delta^{1,3,5(10)}$ - cholestatriene - 3 - ol - 24-one and reducing the latter with lithium aluminum hydride to form 25-aza-19-nor-$\Delta^{1,3,5(10)}$-cholestatriene-3-ol.

16. A hypocholesterolemiant composition comprising a steroid compound selected from the group consisting of 25-aza-cholestatrienes of the formula

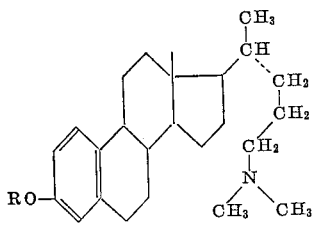

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts and a major amount of a pharmaceutical carrier.

17. The composition of claim 16 wherein the steroid compound is 25-aza-19-nor-$\Delta^{1,3,5(10)}$-cholestatriene-3-ol.

18. The composition of claim 16 wherein the steroid compound is 25 - aza - 19 - nor - $\Delta^{1,3,5(10)}$ - cholestatriene-3-ol hydrochloride.

19. The composition of claim 16 containing 2 to 10 mg. of the steroid compound.

20. A method of reducing cholesterol in warm-blooded animals which comprises administering to the animals an effective amount of a steroid compound selected from the group consisting of 25-aza-cholestatrienes of the formula

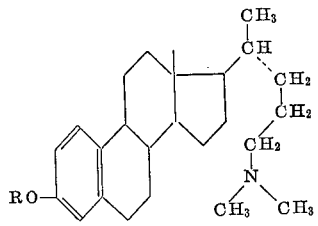

wherein R is selected from the group consisting of hydrogen, lower alkyl of 1 to 7 carbon atoms and an acyl radical of an organic carboxylic acid having 1 to 18 carbon atoms and their non-toxic, pharmacologically acceptable acid addition salts.

21. The method of claim 20 wherein the effective daily dose is 10 to 50 mg.

22. The method of claim 20 wherein the steroid compound is 25-aza-19-nor-$\Delta^{1,3,5(10)}$-cholestatriene-3-ol.

23. The method of claim 20 wherein the steroid compound is 25 - aza - 19 - nor - $\Delta^{1,3,5(10)}$ - cholestatriene-3-ol hydrochloride.

No references cited.

LEWIS GOTTS, *Primary Examiner.*

H. FRENCH, *Examiner.*